(12) United States Patent
Steelberg et al.

(10) Patent No.: US 8,122,467 B2
(45) Date of Patent: Feb. 21, 2012

(54) OPEN API VIDEO SYSTEM AND METHOD OF MAKING AND USING SAME

(76) Inventors: Ryan Steelberg, Irvine, CA (US); Chad Steelberg, Newport Beach, CA (US)

( * ) Notice: Subject to any disclaimer, the term of this patent is extended or adjusted under 35 U.S.C. 154(b) by 640 days.

(21) Appl. No.: 11/981,763

(22) Filed: Oct. 31, 2007

(65) Prior Publication Data

US 2008/0282302 A1    Nov. 13, 2008

Related U.S. Application Data

(60) Provisional application No. 60/928,278, filed on May 7, 2007, provisional application No. 60/959,395, filed on Jul. 13, 2007.

(51) Int. Cl.
*H04N 7/10* (2006.01)
*G06F 3/00* (2006.01)
*H04N 9/80* (2006.01)
*G11B 27/00* (2006.01)
*G06Q 30/00* (2012.01)

(52) U.S. Cl. ............ 725/32; 725/53; 386/249; 386/250; 386/278; 705/14.49

(58) Field of Classification Search .................. 725/32, 725/53; 386/249, 250, 278; 705/14.49
See application file for complete search history.

(56) References Cited

U.S. PATENT DOCUMENTS

| | | |
|---|---|---|
| 2003/0093790 A1 | 5/2003 | Logan et al. |
| 2003/0208763 A1 | 11/2003 | McElhatten et al. |
| 2003/0229900 A1 | 12/2003 | Reisman |
| 2004/0031058 A1 | 2/2004 | Reisman |
| 2004/0064836 A1* | 4/2004 | Ludvig et al. .............. 725/95 |
| 2005/0060238 A1 | 3/2005 | Gravina et al. |
| 2005/0123268 A1* | 6/2005 | Kawaguchi et al. ........... 386/46 |
| 2005/0177850 A1 | 8/2005 | Boylan et al. |
| 2005/0193425 A1 | 9/2005 | Sull et al. |
| 2006/0085835 A1 | 4/2006 | Istvan et al. |
| 2006/0206912 A1 | 9/2006 | Klarfeld et al. |
| 2006/0236342 A1* | 10/2006 | Kunkel et al. .............. 725/52 |
| 2006/0271977 A1 | 11/2006 | Lerman et al. |
| 2007/0006276 A1 | 1/2007 | Ashley et al. |
| 2008/0046920 A1* | 2/2008 | Bill ............................. 725/34 |
| 2008/0304812 A1 | 12/2008 | Jin |
| 2009/0177742 A1* | 7/2009 | Rhoads et al. .............. 709/203 |

* cited by examiner

*Primary Examiner* — Hoang-Vu A Nguyen-Ba
(74) *Attorney, Agent, or Firm* — Tomas J. McWilliams; Edward F. Behm, Jr.; Connolly Bove Lodge & Hutz LLP

(57) ABSTRACT

A video player unit, system and method, and a video hierarchy. Included are at least one memory device, a plurality of communication access points for receiving at least one program play, an open application programming interface associated with the at least one memory device, wherein a plurality of applications correspondent to the open application programming interface allow a user to manipulate metadata associated with ones of the programs plays, wherein the metadata relates to interframe interactivity with detailed aspects of the ones of the program plays, and at least one correlation engine in communication with the open application programming interface, wherein the at least one correlation engine provides for correlation among at least the interframes of the program play to ones of the interframes of other ones of the program plays.

7 Claims, 3 Drawing Sheets

OPEN API VIDEO SYSTEM AND METHOD OF MAKING AND USING SAME

CROSS-REFERENCE TO RELATED APPLICATIONS

This application claims the benefit of U.S. Provisional Application Ser. No. 60/928,278, filed May 7, 2007, and U.S. Provisional Application Ser. No. 60/959,395, filed Jul. 13, 2007, the entire disclosures of which are incorporated by reference herein as if set forth in their entireties. The present invention is related to concurrently filed U.S. patent application Ser. No. 11/981,839, entitled "SYSTEM AND METHOD FOR CREATION AND MANAGEMENT OF ADVERTISING INVENTORY USING METADATA" filed Oct. 31, 2007, the entire contents of which are incorporated herein by reference. The present invention is related to concurrently filed U.S. patent application Ser. No. 11/981.838, entitled "VIDEO-RELATED META DATA ENGINE, SYSTEM AND METHOD" filed Oct.31, 2007, the entire contents of which are incorporated herein by reference.

BACKGROUND OF THE INVENTION

1. Field of the Invention

The present invention is directed to application software and, more particularly, to an open-API digital video play system and a method of making and using same.

2. Description of the Background

Existing audio/visual program play systems offer limited availability of interaction with the subject audio/visual program play, other than to watch and/or listen to the program play. Further, there are limited capabilities in the existing art to obtain information based in the program play, but that is not part of the program play, and there is no availability in the existing art of secondary information, i.e. information that is related to the information based in the program play. Additionally, the current art offers little or no ability for application creators to create and locally apply applications to program plays generated by entities other than those application creators.

Thus, there exists a need for an apparatus, system and method of providing a program play having interactivity therewith via an open application program interface, which interactivity offers information and secondary information based in the program play.

SUMMARY OF THE INVENTION

The present invention includes at least video player unit. The video play includes at least one memory device, a plurality of communication access points for receiving at least one program play, an open application programming interface associated with the at least one memory device, wherein a plurality of applications correspondent to the open application programming interface allow a user to manipulate metadata associated with ones of the programs plays, wherein the metadata relates to interframe interactivity with detailed aspects of the ones of the program plays, and at least one correlation engine in communication with the open application programming interface, wherein the at least one correlation engine provides for correlation among at least for the interframes of the program play to ones of the interframes of other ones of the program plays.

The present invention additionally includes at least a video player unit system having at least one video monitor, at least one memory unit having associated therewith an open application programming interface, and at least one communication access point, wherein at least one program play is received over the at least one communication access point for play on the video monitor, and wherein at least one application associated with the open application programming interface interacts on metadata associated with the program play.

The present invention further includes at least one video hierarchy for providing interframe interaction with one or more program plays. The video hierarchy includes at least one program play comprising a plurality of frames, at least one metatag stream at least partially corresponded to interframe aspects within each of the plurality of frames, at least one message bus in communication with the metatag stream, a plurality of filters in communication with the message bus, wherein each of the plurality of filters delivers messages to and forwards messages from the message bus, and a plurality of applications, wherein each of the plurality of applications is corresponded to multiple ones of the plurality of filters.

Yet further, the present invention includes at least an open application interface video system, including an open application interface into which are programmed a plurality of primary applications for interacting with metatags associated with interframe aspects of a program play, a reporting aspect for tracking and reporting the propriety of the interacting for one or more of the plurality of applications, and at least one locking aspect, wherein at least a portion of the interacting is locked out by the locking aspect in favor of one of no interacting and interacting by a different one of the applications.

Thus, the present invention provides an apparatus, system and method of providing a program play having interactivity therewith via an open application program interface, which interactivity offers information and secondary information based in the program play.

BRIEF DESCRIPTION OF THE FIGURES

The present invention will be described hereinbelow in conjunction with the following figures, in which like numerals represent like items, and wherein.

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical interactive and application programming interface (API) systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
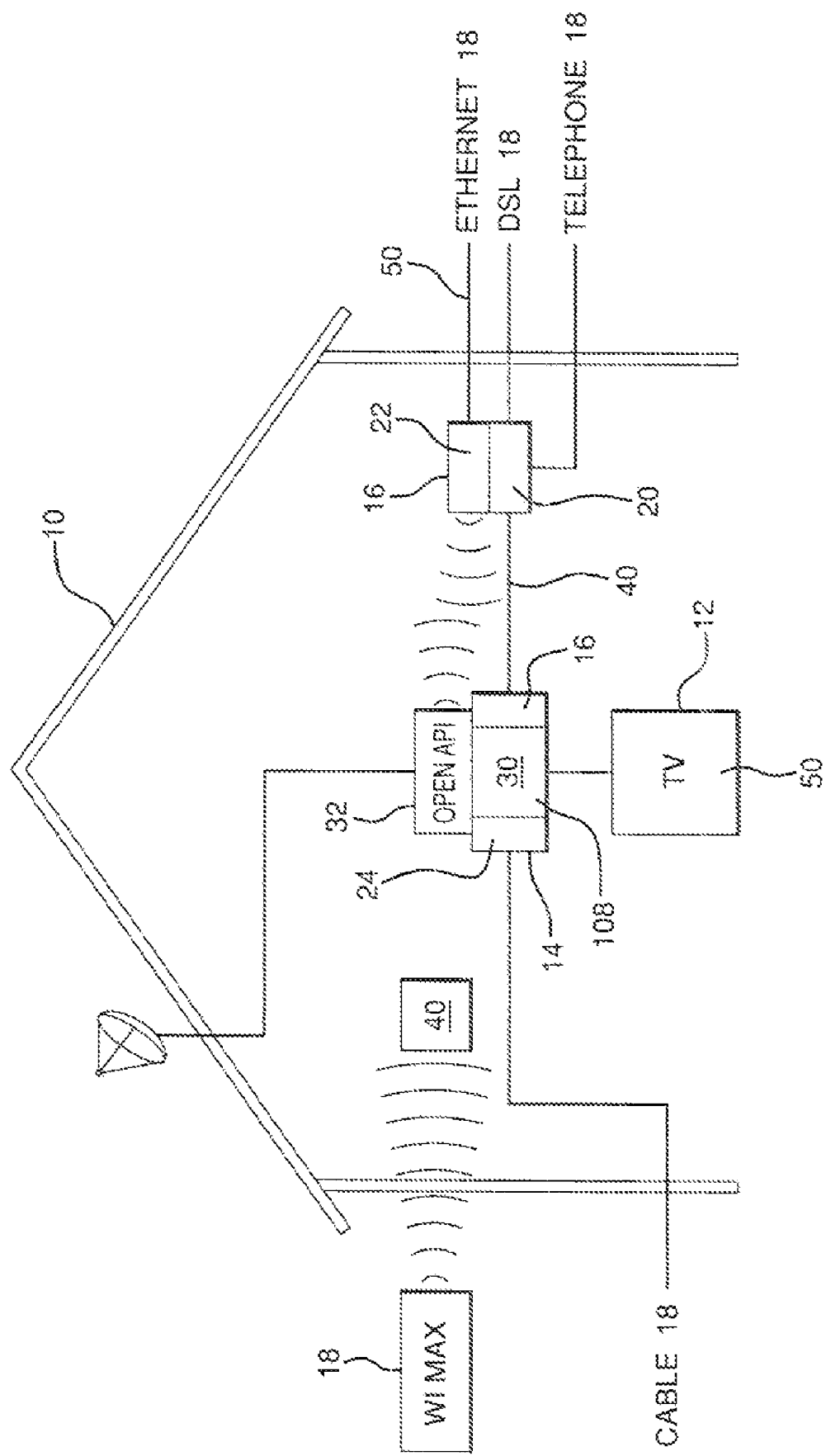
FIG. 1 illustrates an exemplary embodiment of a video player unit system and method.

FIG. 1 is a block diagram illustrating a home 10 having resident therein at least one audio/video monitor 12 having associated therewith at least one video player unit 14 with data reading capability (hereinafter "VPU"). As defined herein, a VPU 14 preferably includes at least one memory unit 16, such as a hard drive, RAM, flash memory, or the like, at least one communication access point 18, the capability to read metadata 20 received via one of the communication access points, the capability to write metadata 22 related to a user's use of the VPU, and the capability to interact with the audio/video monitor 24 to play video. Such communication access points 18 may include one or more of, for example, satellite communication, coaxial cable communication, WiFi™ communication, WiMax™ communication (such as Sprint™/Nextel™, Tier 1™, and Clearwire™, Tier 3™, other wireless LAN (local area network) communication, telephonic or DSL communication, T-111 or Ethernet communication, or the like. Further, the VPU preferably includes an operating environment 30 that has associated therewith at least one application program interface (API) 32. The at least one API allows for a programmer to write applications 108 consistent with the operating environment. The API may be fully resident remotely from each VPU, but communicatively connected thereto via one or more of the communication access points; partially remote from, and partially local to, the VPU; or local to the VPU. The API preferably includes a set of routines, protocols, and/or tools to allow for programmers to create software applications consistent with the operating environment, as will be apparent to those of ordinary skill in the art. Programs/applications consistent with the API may be pushed or pulled to or by the VPU over the one or more communication access points in response to or as a command to the operating environment.

The VPU of the present invention may thus have accessible thereto a plurality of communication media types 40, including, but not limited to, cable television channels, satellite television channels, the worldwide web, email capabilities, data (including video and audio) libraries, and the like, each of which communication media types may form the basis for the creation of a "program play" 50, in which one or more programs (audio or video) are presented to a user. In prior embodiments, television programs that play through the VPU have associated therewith a limited amount of metadata that is indicative only of "thematic", principally outerclip aspects of the television program, such as time of the program play, length of the program play, title of the program play, description of program play and significant actors or actresses associated with the program of the program play. The limited metadata associated with the program play received over one or more of the respective communication access points is then made available, in the prior art, for limited manipulation by the user with regard only to those aspects of the program play with which the thematic metadata is associated. Because the API of prior art VPU technology is closed, programmers are not universally afforded the opportunity to make greater use of information in any respective program play.

The present invention provides, via an open API VPU, an accessibility by the VPU to program plays, applications and/or metadata over any of a plurality of communication access point types mentioned hereinabove, as well as the playing of program plays of any communication media type as also mentioned hereinabove. As such, a myriad of applications may be written by programmers for operation on or in any of the variety of communication media, and for operation over nearly any communication access point type, and such applications may be pushed, pulled, or accessible over any of the aforementioned communication access points. Further, such application may allow for pushing or pulling for numerous interactivity types, including server interactivity, peer interactivity (including point-to-point sharing), and program play feed interactivity, for example. Such interactivity may be, for example, via an accessing of exposed application hooks to the aforementioned metadata, and may include, for example, the offering of application information gained by "crawling" through program plays, such as real-time television or internet broadcasts.

Such applications written for the open API of the present invention may provide improved interactivity by, for example, exposing all aspects or objects of a program play via the application metadata associated with each and every aspect of the program play on any given communication media. For example, metadata may be associated with each word spoken, sound made, and picture shown in any given program play, such as a television or radio program, and as such programmers may expose via the open API information not merely contained within or directly associated with the program play, but that is rather associated with the metadata associated with the program play. The metadata employed in the present invention is discussed further hereinbelow with respect to FIGS. 2 and 3. Metadata, as used herein, is defined to include any type of executable code, computer language code (such as xml or html, object code and/or source code), or "mash-up" data (program associated data integral with data of interest) that may be associated with or into a program play. Metadata as used herein includes metadata associated with a program play by the generator of the program play, by an application creator of an application to be associated with the program play, or by an application or program play created by a local user of the VPU. Thus, metadata may be locally or remotely associated with a program play. Versions of metadata associated with a particular program play or plays may differ depending on any number of factors, including the proximity of the association of the metadata with the subject program play to the time of the play of the program play, the geographic location of the play of the program play, or the time of day of the play of the program play, for example.

The metadata may be made accessible to the user: for interaction via, for example, application software in the form of a program play overlay, in which an overlay-user interface is placed at the forefront of the program play currently in view of the user, which program play is a television program in the example immediately hereinabove; or for creation by the user of applications, or other peer-to-peer offerings, from or by that local user. Such an overlay may take the form of, for example, an overlay that provides links, dropdown menus, windows, or other readily accessible user interfaces. Further, it will be evident to those of ordinary skill in the art that applications may be written that provide multiple windows, menus, or the like simultaneously to a single user, wherein each window plays over a television interface and provides a different program play, and consequently a different overlay, to the user, thereby providing an enhanced version of the known "picture in picture" program plays.

As mentioned hereinabove, the metadata associated with a particular program play of a particular communication media may allow for a "hook" to accessibility of any aspect of the program play, including, but not limited to, externally accessible media, such as other program plays starring the same actor, other program plays starring the same musician, advertising related to goods illustrated in the program play, purchasing points for goods illustrated in the program play, external information, such as World Wide Web (www or Web) information regarding items illustrated in the program play, and the like. Such external information may be accessible via a user activation of aspects of an overlay on the program play, or the accessing of certain aspects of an overlay or the program play itself may lead the user to menus, windows, or the like outside the program play, and the desired information may be accessible from such menus, windows, or the like. Such "hooks" may be made available by the generator of the program play. For example, each program play may have associated therewith a profile that encompasses the program, program thematics throughout each from, object within each frame, and hooks within each frame. Additionally, such a profile may include legalities associated with each aspect of the program play, such as the criteria for associated metatagged advertising with a certain object, all objects, all program play, or portions of program play. Such criteria may exclude certain objects or program play portions, or may dictate that the broadcasters rights in such objects or program play portions change after initial broadcast, or after a set number of broadcasts.

In an exemplary embodiment of the present invention, the open API VPU may allow for an application having an eBay® overlay to be placed on a particular television show, such as "The Antiques Roadshow", and the user may thereby access, via the overlay, similar items available on eBay® to those items being illustrated in the show. Alternatively, rather than the eBay® overlay being placed upon The Antiques Roadshow (the program play of the communication media television), which is received by the VPU via the communication access point cable or satellite, eBay®, an affiliate, or a third party programmer may create a unique channel for reception by the VPU over a different communication access point, which eBay channel shows still photographs, videos, audio, or the like, that relate to items of frequent interest to buyers of eBay® goods, and the eBay® overlay may be placed thereover to allow a user to access further information with regard to those goods or access points of purchase, such as by moving the user to the World Wide Web upon activation by the user of aspects of the overlay. As such, eBay® may create its own unique communications media channel for display over television and may send this new channel for communication to the VPU via WiMax or the like, and as such new "television channels" can be created for access via communication access points not generally used currently by televisions.

In an additional exemplary embodiment, a user may be viewing a highly fashion-related program play, such as Desperate Housewives on ABC, in which different fashions or accessories are highly prevalent. If all such information associated with that program play is metatagged, the user may access information on the fashions being worn, or the accessories being used, and such information may include accessibility to other external information, such as comments from fashion editors, available purchase points of the items of interest, and external payment sites to allow for the purchase of those items of interest.

In an additional exemplary embodiment, a user may enter, to an application pulled to the VPU via the open API, a list of that user's fantasy sports players. The present invention may make available to that user a menu listing those fantasy sports players, and the location at which those fantasy sports players may be watched, recorded, or auto-recorded, on any communication media via any communication access point, in real time. Additionally, certain players may be highlighted, such as when that particular player's team possesses the ball, so that the user may switch between communication media or communication access points to, in a targeted manner, allow that user to watch, record, or auto-record that user's players. Additionally and alternatively with regard to this exemplary embodiment, an application may allow the user to open multiple windows to watch multiple of that user's players in real time, and may maintain in each window an overlay, or may display in a separate window the menu of fantasy players, or may allow the user to toggle between the menu and the video or audio of the games being played.

Thus, for example, a user may select what events certain actions by the VPU are to trigger on, such as autorecording certain events, such as each time a football running back entered into the fantasy football menu interface scores a touchdown. As such, a user can create his or her favorite, or most frequently accessed, metatags, and the metatags may be placed on all content, and on the user's accessing of all content.

In a broader sense, these exemplary embodiments illustrate that one or more applications pulled or pushed via the open API to the VPU may allow the user to assess, in real time, and/or watch, or auto-record, multiple programs, portions of programs, snippets, ads, or the like of interest, inside or outside of any program play (such as via a selectable toolbar generated in accordance with a unique application), use multiple windows of interest simultaneously, be presented with multiple overlays of interest, be presented with multiple menus of interest, all of which may allow the user to access multiple pieces of information or external information not currently available to the user via a television program play. Further for example, as discussed hereinabove, the user may use any application, such as a software overlay, while watching a football game for example, to access any information related to all or any portion of that program play, such as information on the types of shoes worn by that user's favorite player, where the user may buy the jersey worn by that user's favorite player, may access an online purchase point for those shoes or that jersey, and/or may pay using an on-line point of payment account, such as PayPal, all from the VPU of the present invention.

As such, the present invention may also provide a highly targeted marketing tool for advertisers, in that each user will access information of interest to that particular user, thereby ensuring that an advertiser's advertisement is played to a user that is most interested in the item being sold. Thereby, advertisers will have less need to place ads in program plays in which 99% of the viewers of the program play are not interested in the item being sold. Further, the present invention will allow such commerce interaction by each user to be uniquely tracked.

Not only will the addition of metadata add more targeted marketing opportunities, such as to make television ads into drill downs rather than just thirty second videos, but additionally the addition of metadata will allow "add-on programming" associated with television shows, which is presently found on line on the Web, to be brought back to the television media. For example, on line universes that are created for association with shows on television may, via metadata, menus, and/or overlays that access the metadata, allow for those on-line universes to be brought back on to television.

Further, the applications written for the VPU are of the present invention may, as do present VPU's, collect metadata on use by the user of the VPU, as mentioned hereinabove. Without violation of privacy laws, such information may, using the applications for the open API discussed herein, be passed to third parties and the metadata may be collected, thereby allowing third parties to generate yet more targeted advertising, more targeted programs plays, and more communication media (such as communication channels) of interest to the highest number of users.

In light of that discussed hereinabove, the open API of the VPU of the present invention may provide hooks into all items of interest and into the operating environment of the VPU, and the exposure of those hooks via the open API will allow third parties to tie into those hooks. Further, users can access applications associated with those hooks via the metadata tags associated with those hooks. Such metadata tags may allow, for example, applications that make use of overlays, video overlays, water marking, auto pause, auto record, toolbars, menus, and the like. The applications so generated may be locally processed on the VPU (such as for certified applications), or can be streamed to the VPU, or can be associated with entirely new, externally generated communication channels. Additionally, as discussed hereinabove, although the VPU may have associated therewith some local storage, vast quantities of remote storage may be made available, such as at external sites accessible via WiMax or the like. As such, a user may be charged for any level of desired storage for programming, and will not be limited for storage by the hardware of the VPU resident within the user's home.

Thus, the present invention may make available any of a variety of communication channels, and any of a variety of applications for accessing metatags associated with the communication media being played on any of those communication channels. For example, a real estate channel may be made available, and the real estate available on the real estate channel may be targeted to the preferences entered by the user of interest. Alternatively, a completely interactive gaming channel may be made available wherein trivia games, casino games, or the like may be made available in accordance with user preferences, and actions undertaken by the user may be received by the VPU as metadata that may be made available to third parties. Alternatively, complex interfaces may be made available via a metadata feed. For example, a user may watch a nature show on the Discovery Channel™, and may hear or see mention of an animal of interest to that user. The user may then access, such as via an overlay, a link associated with that animal of interest. That link may provide the user with access to, for example, Google Earth™ which may allow for illustration to the user of all animals of that type, anywhere in the world, that have been tagged and placed back into the wild and that are open to sponsorship by a user. The user may be then given the option to sponsor one of the animals in a location of interest to the user, and in the event the user selects an animal to sponsor, an on-line payment interface, such as PayPal™, may be accessible to the user for payment of the sponsorship fee. Alternatively, either within the program play on the Discovery Channel™, or after drilling down to the animal of interest, the user may be presented with a mention of a country of interest to the user, such as Botswana. The user may pause, and either exit the program play via the overlay, or may exit the Google Earth™ interface displaying the animals of interest, and may redirect to find information, such as on Wikipedia™, on "Botswana." After the user has redirected a sufficient number of times to receive the information of interest to the user with regard to Botswana, the user may elect to be redirected back to the initial location of interest, which in this example is either the program play or the information on the animal of interest.

The present invention may also include social networking. Such social networking may include videoconferencing, video messaging, or placement of personal information or personal ads on line, or placement of video or audio generated by a user that the user would like to make accessible to third parties, from the communication access points accessible to the user via the open API VPU, thus making the user "the star of" his or her own show.

The present invention may additionally include, for example, a mobile VPU, wherein VPU features accessed via mobile televisions, televisions not within the home residence, navigation screens within vehicles, or the like, accessible to any of the aforementioned communication access points, and such mobile VPU may communication with the home, open API VPU.

More specifically with regard to the above-referenced metatagging, the metatagging of the present invention is typically to take place interclip, and may be thematically or non-thematically related. More specifically, the tagging may be done interclip and interframe, and/or frame-by-frame, and may relate to words, pictures, and the like that occur within the frame, whether or not related to the thematic nature of the programming. Such tags may be associated with the interframe programming by, for example, the automatic nature of the application then running, may be inserted remotely at the programming for the programming displayed, or may inserted by the users as the programming is viewed. Further, such tagging allows for actions to be taken on discrete portions of an overall program play, unlike the actions made available by the prior art. Additionally, such metatags may be streamed in-content, or in a separate metastream tied to the program play, as discussed with particularity immediately hereinbelow.

As will be apparent to those skilled in the art, a metatag as used herein is a computer-readable language, such as xml, html, or the like, syntax statement that may be sent along with a program play, such as by being sent as a secondary stream fed to a user along with a streamed program play, or that may be sent as part of a program play, such as in the "header" information that describes the computing characteristics of the program play. The metatag may convey information about that with which it is associated (i.e. the program play in this example), and such information may or may not actually be found within such a program play. For example, such metatags may be hooks, such as for user commands, or may make requests of the user, or may be used as keywords in searching of program plays or program play portions. Each such metatag must be given a unique name, or tag, and have associated therewith unique content. Such association of keywords and content may be done automatically, such as by an automated search of a document, such as a script of a program play, or such as by spider searching, or such as by index searching, or may be done manually.

Further, metatags included within frames may be linked and/or correlated to other metatags, within or outside of the program then within view. For example, correlation may be performed from metatag to metatag, in frame, or from metatag to metatag from a frame of one program play to a frame in a separate program play, or from metatag to content stream, for example. Alternatively, correlation of metatag to metatag may occur from a frame within one program play to another frame within the same program play, or interframe between program plays. Correlation may be employed using authoring standard techniques and/or languages, such as Synchronized Multimedia Integration Language (SMIL) or Microsoft Synchronized Accessible Media Interchange (SAMI), among others, which may be separate from, and in a different syntax than, the program play stream(s). Further or alternatively, correlation functions and correlation branching known to those skilled in the art of mathematics may be employed by the applications programmed into the open API of the present invention, with regard to each frame, or frame portion, of every program play accessible to the open API VPU.

In certain exemplary embodiments, watermarking techniques typically employed for embedding correlated audiovisual interaction information may be used to correlate frames, inter-frames, or program plays in the present invention, with or without modification to the typical metatag data stream or headers (see, e.g., "Stream Based Interactive Video Language Authoring using Correlated Audiovisual Watermarking," Xu, et al., ICITA '05 Proceedings, IEEE). Further, as such, upon placement into or into association with the program play, inframe metatags may have correlated therewith not only aspects of inframes of other program plays, but additionally any of the number of functions to be performed by the respective applications discussed herein throughout.

The association of metatags to other metatags may, in fact, create "clickable video." Clickable video provides true interactivity to a watcher of any program play that presents the video to the user. As such, for example, the user may pause the video and use display objects known to those skilled in the art, such as a mouse cursor, to interact with portions of the video, or may call up such an interactive cursor to interact with the video while the video is playing. Further, metatagging may allow for variations in the mouse cursor that correspond to those aspects of the video currently playing when the mouse cursor is brought up on the screen. For example, if a portion of the video includes an actor in the video drinking a can of Coke, the mouse cursor, if called during that portion of the video, might display as a miniature can of Coke.

Thus, once the metastream is defined, clickable video frames can be created, correlation to the same or other metastreams may be performed, and passive processing may be performed with third party API's. Such third party processing may include, for example, remote commands such as VPU commands, that may, for example, allow for the taping of certain snippets of interest within larger program shows.

The manner of metatagging used in the present invention may, for example, be any methodology of metatagging known to those skilled in the art. Further, a program play may be metatagged before initial broadcast, before rebroadcast, or during the streaming of a broadcast stream. As such, rights in such metatagging may be available and divisible by pre-initial broadcast, in-broadcast, and rebroadcast, for example.

Figure 2:
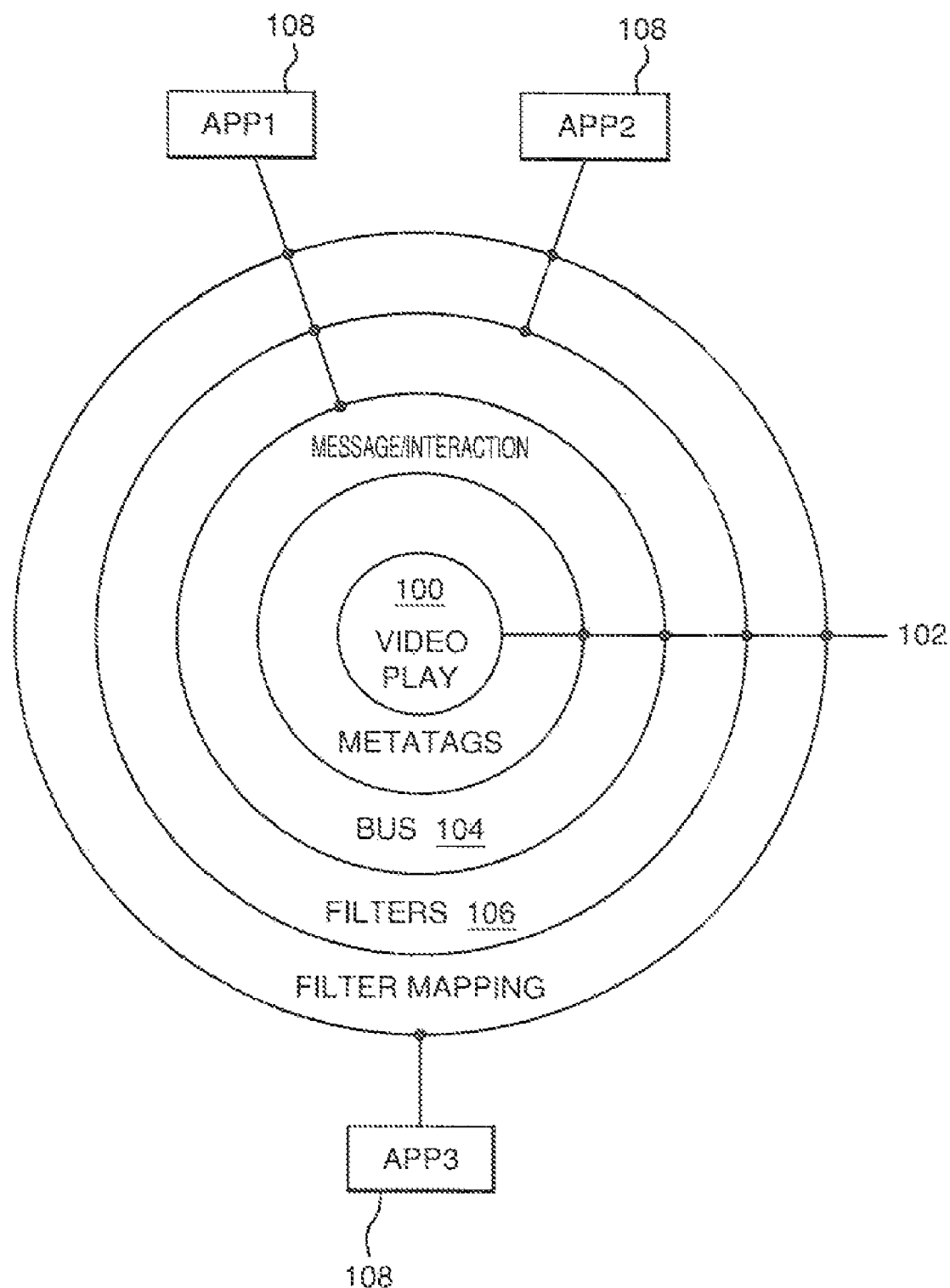
FIG. 2 illustrates an exemplary embodiment of a video hierarchical system and method.

The present invention may be hierarchically organized as shown in FIG. 2. FIG. 2 illustrates, as the focal point of the present invention, a video 100 that will be displayed to the user as a program play. The video is metatagged as shown, and the hierarchy 102 outside, but associated with, the metatags may then communicate with and using the metatags via a message bus 104. Surrounding the message bus may be a variety of filters 106, and surrounding the filters may be a variety of applications 108. The applications may access any of a number of the filters, and both the applications and the filters may have accessible thereto the message bus. The message bus may make available a variety of operation commands for interaction with the metatags, and the metatags may provide interoperability of the commands with the video.

The filters may be mapped into a variety of commands made available in the message bus, and thus the filters may be of a variety of types. For example, filters may include key word filters, commerce-type filters, location filters, geolocation filters, correlation filters, insertion filters such as for secondary feeds, and social filters, programmatic publishing filters, automatic publishing filters, and the like. The mapping of user commands performed by the filters, and performed by the applications that run the filters, may cause the application of one filter type to be a causation for application of a filter of another type. As such, applications can likewise feed one another, such as wherein an application of one type, such as a search application, accesses an application of another type, such as a Wikipedia engine, whereby answers to a user inquiry into a search engine can be obtained.

Further, for example, one application and/or filter may allow the saving of certain aspects of a program based on the application of another application indicating that the user wishes to seek certain snippets associated with certain topics. Further, once such snippets are saved, yet another application may allow the shipment of the frames or snippets of interest, based on the metadata illustrating that such frames are of interest, between users, such as via email programs, internet mail or WiFi for example. Additionally, as mentioned hereinabove, the open API aspects of the VPU of the present invention may allow for programmatic publishing, wherein an application actively publishes certain metadata or certain information received into the programming via, for example, automatic publishing (wherein such publishing occurs passively).

Figure 3:
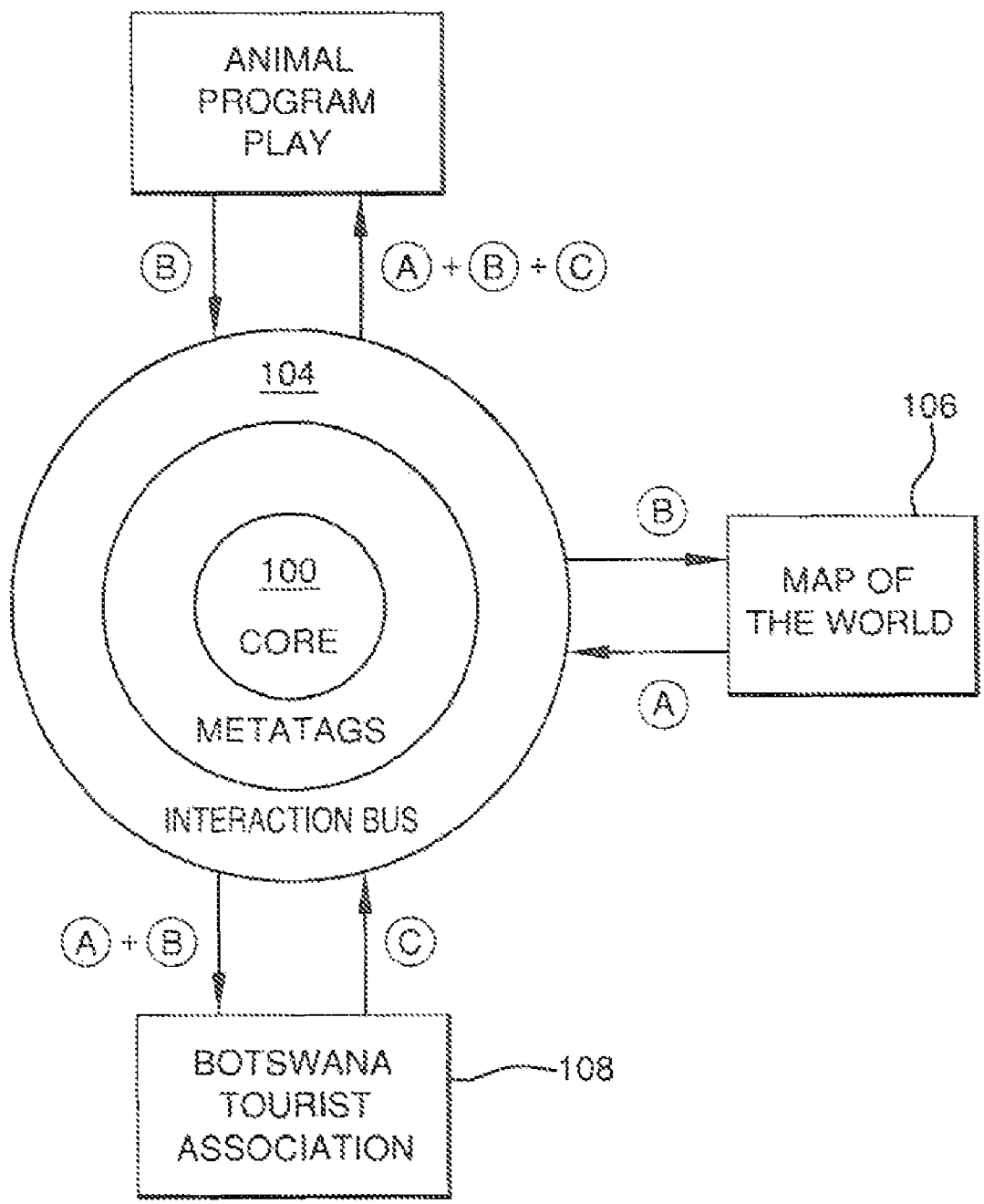
FIG. 3 is a more specific exemplary embodiment of the present invention.

In a more specific example illustrated in FIG. 3, certain applications 108 and/or filters 106 interact with the message bus 104. As illustrated, the applications and/or filters may have associated therewith core applications, and may be surrounded by metatags in a manner similar to the base video of interest. In an exemplary embodiment, the metatags of the application into which the user expresses interest in the location of certain animals of the world may come from a mapping application, wherein interaction B, as shown, interacts with the message bus based on the interaction B from the user. The metatag reached by interaction B may be a geographic location within a program then within view of the user, and may lead to interaction A reaching out to make other assessments of the user's mapped location of interest. For example, a different application may then be accessed by the first application based on the correlation of interactions A and B, and this different application may assess a variety of different animals, available animal sponsorships, records of national disasters, phone books, flora, or the like, that are resident in that particular geographic location. Such information may then be fed back to the user via the message bus interface, or the interest from the user may simply be written to the external application, and may be tracked by the application programmer. As such, multiple applications may collaborate as between the applications, may correlate as between the applications, and may filter as between the applications, and such actions may occur automatically, via programmatic publishing, and/or may be based on certain permissions.

The filtering and applications of the present invention made available via the open API VPU interface may thus be dependent on the capability to create an instream metastream that is not necessarily thematically related to any of the programs shown to the user. Such an instream metastream may include a metastream associated with any instream programming, which may include not only the programming of interest but also advertising associated with, or accessible from, the programming of interest.

The open API of the present invention may additionally allow for implementation of an accounting and reporting system 150. For example, video or audio discontinuities, or the non-occurrence of events, tracked or trackable via the metadata associated with such a program play may allow for an accounting or reporting of any missed program plays (such as paid-for advertising that fails to play) based on a liability, rules-based, or other such system; or billing for certain uses of program plays, portions thereof, or metadata or metadata interactions associated with such program plays or portions thereof, via one or more applications employed via the API. Such applications, if used in conjunction with a VPU registered to a known user, may, for example, allow for automated billing for certain uses of metadata or program plays, such as to the account of the known user of the VPU, or for monitoring of the program plays preferred by, or most frequently viewed by, the known user.

Additionally, the present invention may include exclusions (exclusion applications) 108 from action by certain or all applications, which may be dictated by one or more other applications. For example, certain objects within a program play may be "locked," or "nulled," from being interacted with certain metadata. Such objects may be blocked from any association with metadata, or may be blocked by initial association with metadata from association with other metadata. For example, interaction may be locked out for appearances of guns or cigarettes in a program play. Further, for example, in the event an advertisement is associated with a particular object or portion of a program play, it may be preferable to block association of different advertising with that object or program play by that or another application. For example, a program play of a professional football game may include a block on association of metadata/advertising with the players' helmets, because of an exclusive advertising deal between the league and a third party that only that third party may advertise/sell the helmets of the players. Alternatively, all objects or all program plays may be initially locked, and may be periodically and/or systematically unlocked to allow for association of some objects, or portions of program plays, with metadata for interaction. Of course, such unlocking may be responsive to the purchase by a party of the capability to associate metadata with that object or portion of a program play.

As will be apparent to those skilled in the art based on the disclosure herein, not only certain objects may be locked, but likewise certain applications may locked out. For example, certain presenters of program plays who offer an "On-Demand" service may wish to lock out "On-Demand" applications from use with the program plays of those certain presenters.

The metadata associated with the program plays of the present invention may be initially associated in a number of ways, and in accordance with a standard or non-standard taxonomy. All or certain of the metadata may be associated remotely from the VPU that ultimately plays the program play associated with the metadata. Alternatively, all or certain of the metadata may be locally associated, at the VPU, with the program play.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

We claim:

1. A computer-implemented system comprising at least one computerized memory communicatively associated with at least one processor programmed for providing interframe interaction with one or more program plays, comprising:
   at least one program play comprising a plurality of frames;
   at least one metatag stream at least partially indicative of interframe aspects within each of the plurality of frames;
   at least one message bus in communication with the at least one metatag stream;
   a plurality of filters in communication with the at least one message bus, wherein each of the plurality of filters delivers messages to and forwards messages from said at least one message bus directing interactions between said metatag stream and the interframe aspects; and
   a plurality of applications, wherein each of said plurality of applications is corresponded to multiple ones of said plurality of filters, wherein each of said plurality of filters is corresponded to at least one of said plurality of applications, and wherein each of said plurality of applications generates ones of the messages and receives ones of the messages and wherein at least one of said plurality of applications is interactive for a consumer of the at least one program play.

2. The video hierarchy of claim 1, wherein ones of said plurality of filters comprise at least one selected from the group consisting of key word filters, commerce-type filters, location filters, geolocation filters, correlation filters, insertion filters, social filters, programmatic publishing filters, and automatic publishing filters.

3. The video hierarchy of claim 1, wherein at least one of said applications responds to ones of the messages generated by at least one other of the applications.

4. The video hierarchy of claim 1, wherein at least one of said plurality of filters responds to ones of the messages generated by at least one other of the plurality of filters.

5. The video hierarchy of claim 1, wherein said at least one program play comprises a core application.

6. The video hierarchy of claim 1, wherein the metatag stream is non-thematic with respect to the at least one program play.

7. The video hierarchy of claim 1, wherein the metatag stream is thematic only with respect to the interframe aspects of the one or more program play.

* * * * *